April 17, 1928.
J. ANDERSON
CLAMP
Filed April 5, 1927
1,666,079
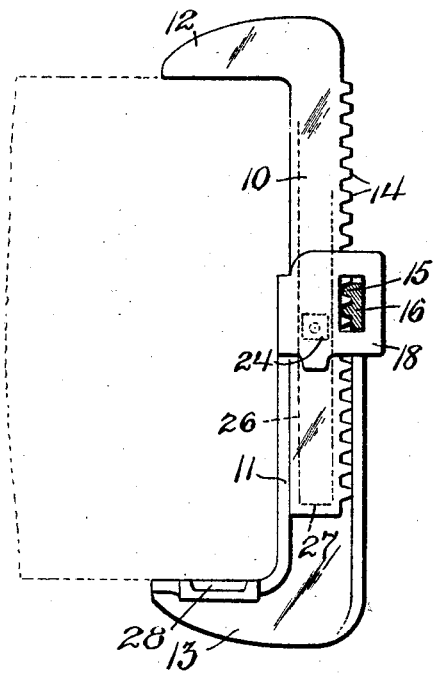
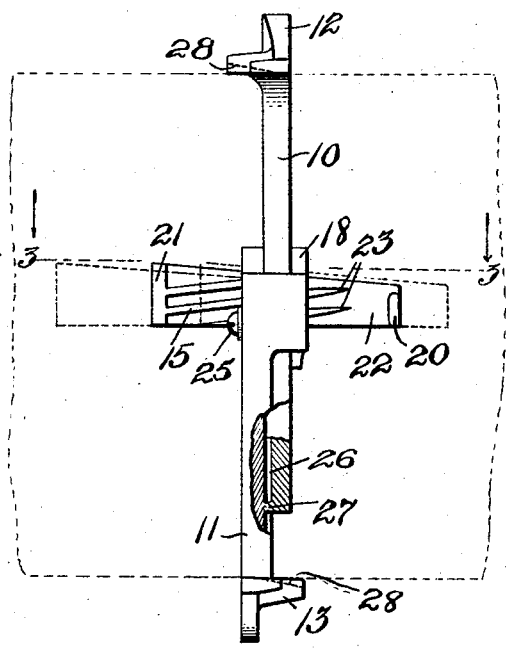
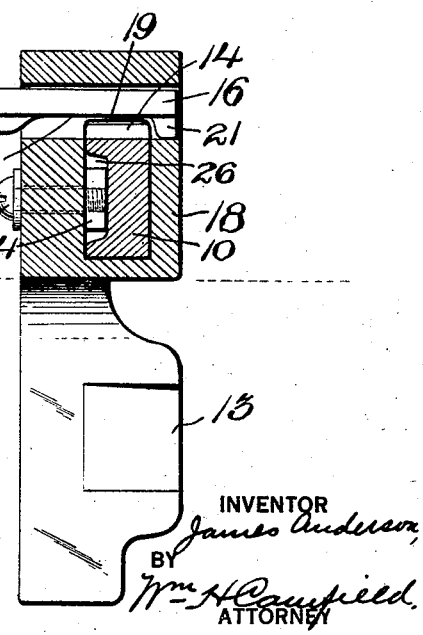
INVENTOR
James Anderson,
BY
Wm H Caufield
ATTORNEY Patented Apr. 17, 1928.

1,666,079

UNITED STATES PATENT OFFICE.

JAMES ANDERSON, OF ELIZABETH, NEW JERSEY.

CLAMP.

Application filed April 5, 1927. Serial No. 181,070.

This invention relates to an improved clamp which can be used for various purposes but is particularly adapted for use on a molder's flask, the clamp comprising two arms which have jaws on them and which can be quickly adjusted to an approximate clamping position and then the clamp is forced, by a blow or two with a hammer on a transverse wedge, which has inclined teeth which act as cam surfaces on teeth that are on the edge of one of the arms, the wedge sliding freely in the other arm. The device is constructed so that the various parts can not become separated so that a unitary device is presented for handling.

The invention is illustrated in the accompanying drawings in which Figure 1 is a side view of my improved form of clamp with the wedge shown in section. Figure 2 is a front view of the clamp shown in Figure 1 and Figure 3 is an enlarged section on line 3—3 in Figure 2.

The clamp comprises two arms 10 and 11 which are slidable relative to each other and have suitable projecting parts which form jaws as at 12 and 13, respectively, so that when these jaws are forced toward each other a tight clamp is the result. One of these jaws is provided with teeth 14 which are adapted to mesh with teeth 15 on the wedge 16, the wedge 16 being slidable in the other jaw 11. The teeth 15 are inclined relative to the path of travel of the wedge so that as the wedge is forced in it acts to move the arm 10 inwardly until it is tightly clamped. The wedge is mounted in a slide 17 in the boss 18 of the arm 11, this opening being at right angles to the opening 19 in the boss through which the arm 10 slides. A flange 20 at one end of the wedge and a flange 21 at the other end of the wedge embody means for preventing a complete withdrawal of the wedge in one direction and prevents its passing through in the other direction.

The teeth 15 terminate short of the wedge 20 providing the plane surface 22 so that when the wedge is forced back to the position shown in Figure 3 and in the position shown in dotted outline to the left of Figure 2 the arm 10 is free to slide. The teeth 15 are preferably pointed as at 23 to facilitate their finding the spaces between the teeth 14. The outward sliding movement of the two arms is limited and in the form shown is provided by an abutment 24 such as a nut on the screw 25 and this abutment is in a recessed part 26 on the face of the arm 10, the recess terminating short of the arm to act as an abutment as at 27 which by engaging the projection 24 stops the outward movement of the arms relative to each other. The parts are fitted loosely so that they can be quickly moved, easily slid and when the arms are approximately in clamping position a tap or two on the wide end of the wedge 16 forces the parts tightly together.

An improved feature of the clamp is the ability to give it slightly increased pressure without any shock. When green sand is being used in a mold any sharp blow will dislodge the sand and for this reason the clamps must be tightened without any disturbance of the mold and the skill of the molder, therefore, is exercised in so applying the pressure to the mold as to give it sufficient pressure but not excess pressure and to do this without shock such as might be caused by a blow with a hammer.

The clamp is adjusted to approximately its size or it is made of a certain size in the first place as in the case of a solid clamp and it is placed on the mold which it fits but is not snug.

It has been the custom to use pinch bars on these clamps and thus push them up on a wedge so as to gradually increase the pressure. In my form of clamp I cant or tilt the clamp slightly so as to cause it to have enough "bite" to clamp the mold tightly. For this purpose I arrange in each of the jaws and on the face that is opposed to the other jaw, a recess 28 disposed so that one jaw can be worked to the right, for instance, the upper jaw in Figure 2, and the lower jaw in Figure 2 could be worked to the left. The pinch bar is put in the recess and bears on the mold and then the leverage causes the edge of the jaw to "bite" down into the mold to a slight extent and the same takes place at the other jaws so that the clamp is shifted slightly from the vertical and while the pressure can be considerable it is exercised so gently that the sand in the mold is not disturbed.

In the form illustrated the recesses are tapered, one extending inwardly from one edge of one jaw and one extending inwardly from the other edge of the opposite jaw.

I claim:

1. A clamp comprising two arms in sliding engagement one having teeth on one edge and the other having a transverse opening, and a wedge slidable in the opening and having inclined teeth to engage the teeth of the arm, the wedge having the teeth terminate short of one end and having a flange on each end to prevent the wedge from being entirely withdrawn.

2. A clamp with jaws at its ends and extending so as to be opposed to each other, one jaw having a recessed part on one edge of its inner face and the other jaw having a recessed part on the other side of its inner face to provide openings to enable a pinch bar to be inserted whereby the clamp can be canted to increase the pressure without shock.

In testimony whereof I affix my signature.

JAMES ANDERSON.